Figure 6:
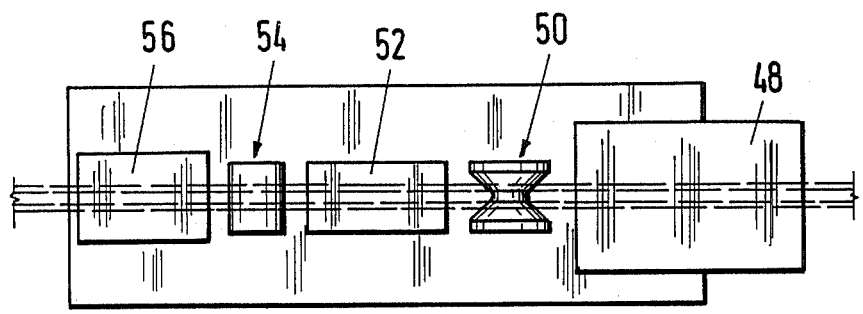

United States Patent [19]

Kulla

[11] Patent Number: 4,778,504

[45] Date of Patent: Oct. 18, 1988

[54] METHOD AND APPARATUS FOR BONDING THE PANE EDGES OF ALL-GLASS MULTIPLE PANES

[75] Inventor: Josef Kulla, Witten, Fed. Rep. of Germany

[73] Assignee: Flachglas Aktiengesellschaft, Fed. Rep. of Germany

[21] Appl. No.: 79,647

[22] Filed: Jul. 30, 1987

[30] Foreign Application Priority Data

Jul. 30, 1986 [DE] Fed. Rep. of Germany ....... 3625798
Jul. 30, 1986 [DE] Fed. Rep. of Germany ....... 3625807
Jul. 30, 1986 [DE] Fed. Rep. of Germany ....... 3625797
Jul. 30, 1986 [DE] Fed. Rep. of Germany ....... 3625806

[51] Int. Cl.$^4$ ............................................. C03B 23/24
[52] U.S. Cl. ........................................ 65/58; 65/41; 65/55; 65/152; 65/156
[58] Field of Search ................. 65/41, 36, 55, 58, 152, 65/156

[56] References Cited

U.S. PATENT DOCUMENTS

| | | | |
|---|---|---|---|
| 2,761,248 | 9/1956 | Cowley et al. | 65/58 X |
| 2,761,249 | 9/1956 | Olson et al. | 65/58 X |
| 2,951,317 | 9/1960 | Woods | 65/152 X |
| 3,103,429 | 9/1963 | Krüger et al. | 65/58 X |
| 3,384,468 | 5/1968 | Dean | 65/152 |

Primary Examiner—Arthur Kellogg
Attorney, Agent, or Firm—Hill, Van Santen, Steadman & Simpson

[57] ABSTRACT

Method for bonding the edges of all-glass multiple panes, particularly all-glass double panes, whereby the individual panes moving through an elongated tunnel furnace or the like are cut to size, may potentially be washed, are subjected to an at least partial edge smoothing, are aligned with one another and, after being pre-heated to a pre-heating temperature lying below the deformation temperature of the glass, are bonded to one another at the horizontal and vertical pane edges, being bonded while standing upright, characterized in that individual panes cut to size and potentially washed are individually pre-heated lying on their surface facing away from the pane interspace of the all-glass multiple pane to be manufactured, and in that the individual panes are subsequently placed upright and are placed together to form groups of individual panes in accord with an all-glass multiple pane to be manufactured, whereupon the edge bonding ensues; further, apparatus for the implementation thereof.

39 Claims, 7 Drawing Sheets

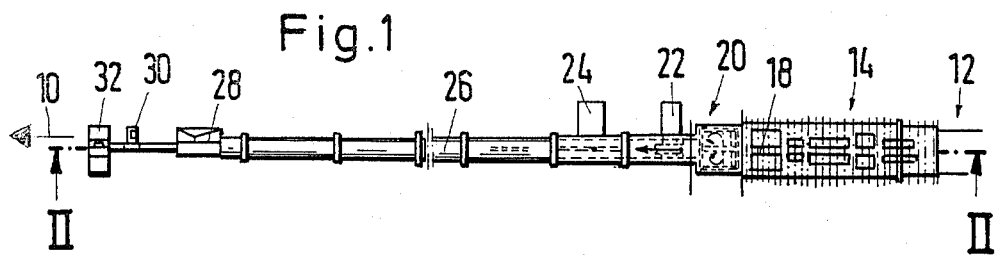
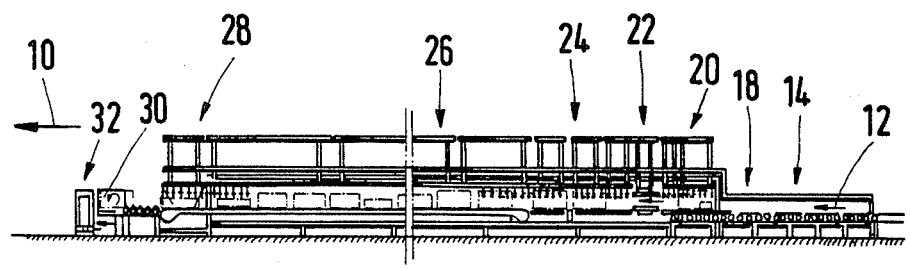
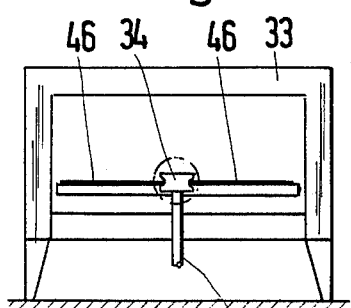
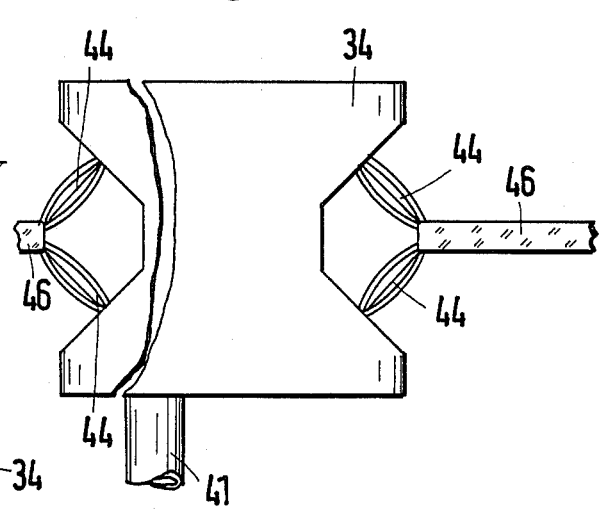
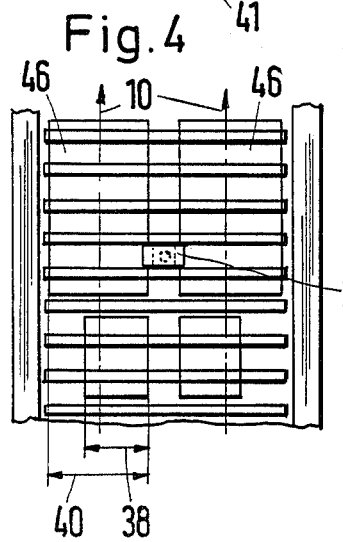

METHOD AND APPARATUS FOR BONDING THE PANE EDGES OF ALL-GLASS MULTIPLE PANES

The invention is directed to a method for bonding or: fusing, welding the edges of all-glass [or: rimlock] multiple panes, particularly of all-glass or: rimlock double panes, in accord with the preamble of patent claim 1 and is also directed to an apparatus in accord with the preamble of patent claim 12 for the implementation of this method.

In a known apparatus of the species (German Pat. No. 25 06 251), the individual panes of the all-glass double panes to be manufactured are conducted through the elongated tunnel welding furnace in upright position, being conducted therethrough after their edges have been ground, whereby both the pre-heating of the individual panes to a temperature of about 500° C. as well as the welding operation ensue at upright panes. On the other hand, U.S. Pat. No. 4,169,622 already discloses that the welding in the manufacture of all-glass double panes be undertaken given horizontally arranged panes, but that the cooling be undertaken given vertically arranged panes; this known apparatus has the disadvantage that it is relatively difficult to keep the individual panes at the desired spacing during the welding process. In the apparatus of German Pat. No. 20 55 252 for the manufacture of single-pane safety glass, the pre-heating of the panes ensues in their prone condition, whereas the bending ensues in their erect condition; this, however, does thereby not involve the problem of preparing the individual panes of all-glass double panes with the temperature stressing that is thereby specifically present nor the mechanical problems of manipulating the panes inside the tunnel furnace which are thereby present. German Utility Model No. 71 42 363 as well as U.S. Pat. No. 3,166,397 are directed to the melting-off of glass panes in their edge region for the prevention of micro-cracks or, respectively, to the fire-polishing of the glass edges in order to avoid a more involved edge grinding that would otherwise be necessary; the measures disclosed therein, however, are incapable of preventing the above-recited problems in the Prior Art of the species.

German Pat. No. 10 63 349 discloses a method as well as an apparatus of the species under consideration here wherein the edges of the individual panes—after being heated to the welding temperature which, for example, can amount to about 850° C. in the case of sodium silicate glass—are first brought toward one another by a pair of molding rollers and are then bent together and thereby fused. The heating of the edge regions of the individual panes thereby ensues with outside burners that generate flames directed essentially perpendicularly to the plane of the panes. This procedure wherein, thus, the edge regions of the individual panes are heated to the welding temperature in a single heating step has the disadvantage that relatively large pane regions must be heated to a relatively high temperature, a considerable expenditure of time and energy resulting therefrom and being further intensified in that, of course, a very large part of the panes situated at a relatively high temperature must be cooled down later in the cooling mean. This disadvantage is essentially based thereon that the outside burner flames cannot directly charge the circumferential edges of the individual panes since, of course, they are essentially directed onto the outside surfaces of the edge regions of the individual panes, these outside surfaces being parallel to the plane of the pane. Over and above this, it is also necessary to heat a relatively broad edge region to the heating temperature. Procedures similar to those in the Prior Art defining the species are disclosed by German Pat. No. 9 75 079, by U.S. Pat. No. 1,258,036 and by U.S. Pat. No. 3,384,468. U.S. Pat. No. 3,205,056 generally discloses an apparatus for manufacturing all-glass multiple panes with the pane arrangement traversing the various heating and shaping apparatus.

German Pat. No. 23 63 300 discloses a tilting apparatus of interest in this context, whereby a respective individual pane following a first pane of a double-glass pane to be manufactured is pivoted by 180° with a tilting frame and is deposited on the preceding individual pane. Both individual panes are then swivelled up into their vertical position with a further tilting frame, whereby the detents against which the two individual panes have moved in the latter tilting frame have such a spacing from the tilting axis thereof that the vertically placed panes are deposited onto conveyor rollers of the upright conveyor that lie above the conveying plane of the flat conveying means. As a result thereof, it is possible to carry the vertically placed pair of panes off already with the upright conveyor while the appertaining tilting frame has not yet again reached its acceptance position under the conveying plane of the flat conveyor means. The known apparatus makes it necessary to provide a relatively complicated swivelling mechanism in that, namely, the following, individual pane to be deposited on the bottom individual pane, of course, must be held in a suitable way at the appertaining tilting frame for deposit, whereby, in particular, the co-planar alignment of the individual panes of the double-glass pane to be manufactured—this being a matter of an insulating glass pane having glued edge profiles therein—is also to be executed in horizontal position, when setting the mutually aligned panes aligned in a sandwich arrangement into an erect [position], the removal from the detents of the appertaining tilting frame in vertical position also presents difficulties.

In the apparatus of German Pat. No. 25 06 251, moreover, the guide elements are executed as aerostatic air bearings at which the individual panes of the all-glass double pane to be manufactured with the known apparatus are conducted past in gliding fashion during the welding process, being conducted past with a separate conveyor means. This apparatus has definitely proven itself in practice, but it has proven desirable to not only hold and guide the individual panes of the all-glass multiple pane to be manufactured at the desired spacing with a single guide apparatus but to simultaneously be able to conduct them past the burner devices of the welding means in the welding station and to make potential movement that can occur during deformation and welding of the glass edges impossible.

German Pat. No. 10 81 196 already discloses an apparatus for bonding or welding the edges of multiple glass panes wherein entrained vacuum holders are employed; the forward conveying and return as well as the exact positioning of the individual panes with these vacuum holders, however, requires a relatively involved and complicated mechanism. On the other hand, German Published Application No. 35 29 892 already discloses the idea of using endless vacuum belts for conveying upright glass panes—for manufacturing insulating glass therein—, whereby, however, the glass panes are charged with underpressure over an elongated region between two respective air-impermeable suction belts, said glass panes lying against an open underpressure channel.

Such endless vacuum belts do not have units available that unproblematically convey the glass panes heated, for example, to 500° C. that are used for the manufacture of all-glass double panes or: glazings.

The object of the invention is to improve the method of the species and the apparatus of the species to the effect that a uniform heating of the individual panes given higher temperatures in the pre-heating zone is enabled independent of format without involved pane guidances, being optimally enabled without edge grinding, whereby the conveyor means that were hitherto standard are to be simplified and a more uniform wear thereof is to be guaranteed by the exclusive arrangement of the conveying means in the furnace.

In particular, it should thereby be possible to manufacture all-glass multiple panes or: glazings having edge configurations optimized for the respective use, manufacturing these with reduced energy outlay and with a lower thermal stressing of the panes given a considerable timesavings. Given a simpler structure of a tilting mechanism that is preferably employed, the invention also preferably strives to be able to align the successive, individual panes delivered in horizontal position with one another in vertical arrangement, whereby the placing of the individual panes from the detents of the tilting frame onto the pane edges should be enabled in a gentle way that is especially reliable. Finally, it is also an aim of the invention to be able to reliably hold, position and convey the individual panes without a separate conveyor means in the welding station for the manufacture of the all-glass multiple panes or glazings. In a method of the species initially cited, this object is inventively achieved by the features recited in the characterizing part of patent claim 1. The apparatus proposed for resolving the object on which the invention is based is characterized by the features recited in the characterizing part of patent claim 12. Especially preferred embodiments of the method as well as of the apparatus of the invention are the subject matter of patent claims 2 through 11 and, respectively, 13 through 39.

In that, in a departure from the Prior Art in the manufacture of all-glass double panes or glazings, the individual panes are heated in horizontal position in the pre-heating furnace, a uniform heating that is independent of format can be achieved given high shape stability and higher pre-heating temperatures obtainable as a result thereof, whereby no tilt protection and the like is required. When the pane edges are fire-polished in the claimed way—as is especially advantageous in accord with the invention—, then the individual panes need not be ground before introduction into the tunnel furnace; on the contrary, it is assured in this way that the horizontal, bottom pane edges on which the glass panes run in the welding station are also completely planar, whereby imprecisions are avoided and micro-cracks can likewise not occur.

In a preferred development, the invention is also particularly based on the surprising perception that one succeeds in eliminating the stated disadvantages of the Prior Art and in resolving the stated object when then single heating step that was hitherto provided is divided into two steps, in that, namely, only the heating of the edge regions of the individual panes to a deformation temperature lying below the welding temperature ensues first and heating to the welding temperature is undertaken only after the edge regions of the individual panes have been bent toward one another and, finally, the pane edges are fused to one another. This has the advantage that only a relatively narrow edge region need be heated to the welding temperature ultimately required for the welding and fusing, involving a correspondingly lower thermal stress on the center of the pane and considerable advantages in the later cooling process; whereby, second, it is guaranteed that, first, in the flat pane configuration when heating to the deformation temperature and, second, when heating to the welding temperature in the bent configuration of the edge regions of the panes, the burner flames—preferably gas burner jets in a known way—can be directed onto the regions to be warmed or, respectively, heated at the respectively optimum angle.

In a preferred development, further, the invention is based on the surprising perception that one succeeds in avoiding the disadvantages of the known apparatus and in creating a considerably simpler erecting and aligning mechanism—this allowing the faultless positioning of the individual panes in upright position after being conveyed in in horizontal position without placing the individual panes on top of one another in horizontal position in an involved fashion upon retention of the advantage that those sides of the individual panes that did not respectively come into contact with the conveying rollers of the flat conveyor are faced toward the pane interspace of the double glass pane to be manufactured —when two tilting frames are used that are oppositely movable from a respectively horizontal acceptance position into a respectively essentially vertical delivery position, whereby the flat conveyor extends over the entire acceptance region of the two lowered tilting frames situated in their acceptance position, extending thereover under the bottom edge of the upright conveyor. In the acceptance position, the detents of the tilting frames are thereby lowered under the conveying plane of the through flat conveyor, so that, thus, the two individual panes moved in on the flat conveyor detached from and at a distance from one another can, in particular, pass the detent of the "first" tilting frame as seen in conveying direction without further ado. As soon as the tilting frames are then swivelled up, the individual panes slide thereonto slightly in the direction toward the swivelling axes, whereby they are seated against the detents. As a consequence of their prescribed spacing from the swivelling axes, the detents of the tilting frames guarantee that the bottom pane edges are lifted to a level that lies slightly above the conveyor rollers of the upright conveyor. These are in turn arranged on a level that lies above the conveying plane of the conveyor rollers of the flat conveyor. As soon as the righted individual panes have then been deposited onto the conveyor rollers of the upright conveyor, their longitudinal positioning can ensue in a known way by mutual displacement on the conveyor roller of the upright conveyor, ensuing, for example, with a push rod or the like on the basis whereof the two individual panes are then conveyed farther. Since the individual panes placed on the conveyor rollers of the upright conveyor lie above the through flat conveyor together with the upright conveyor itself, the tilting frames which are then lowered again into the acceptance position can be re-loaded with individual panes by the flat conveyor while the individual panes situated on the upright conveyor have not yet been carried off, for example during the relatively slow feed of these into a welding station given the manufacture of all-glass double panes.

The inventively provided transfer and alignment means guarantees a faultless positioning of the individual panes given the farthest-reaching preservation of the pane edges which, of course, are not yet provided with an edge profile or the like in the apparatus of the invention before they are placed upright. This is of particular significance in the manufacture of all-glass double panes wherein the individual panes are transferred into a welding station or the like after having been placed upright with the apparatus of the invention.

Finally, the invention is also based on the perception that one succeeds in utilizing the known advantages of entrained suction belts without having to accept the mechanical and control-oriented problems of entrained vacuum holders in that suction belts provided with individual suction openings arranged spaced in longitudinal direction are employed, these suction belts being in turn seated against a vacuum box that can be charged with underpressure. It is guaranteed as a result thereof that the individual panes are charged with the required holding force in a merely punctiform fashion, as in the employment of individual vacuum holders, whereas the endless fashioning of the suction belts simultaneously guarantees an especially elegant, synchronous mechanical drive of the pairs of suction belts required. As proposed in a special embodiment of the invention, it is thereby especially advantageous when the vacuum box is designed bipartite, namely first composed of a carrying chamber against which the suction belts provided with the suction bores are seated and, second, comprising an underpressure channel which is in turn connected with the underpressure source and communicates with the carrying chamber via connecting openings. The crossection of the connecting openings can thereby be varied; at the very least, these can be partially closed so that pressure losses during introduction and withdrawal of the individual panes to be held by the appertaining pair of suction belts are avoided.

Figure 7:
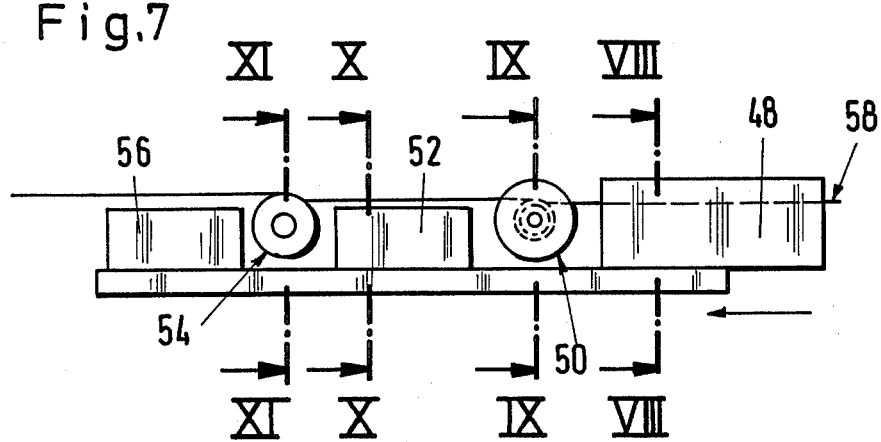
Figure 8:
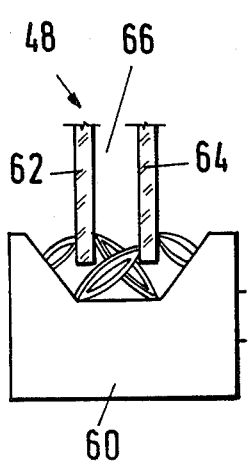
Figure 9:
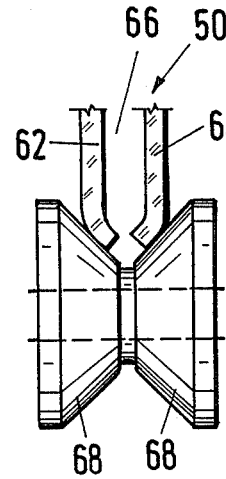
Figure 10:
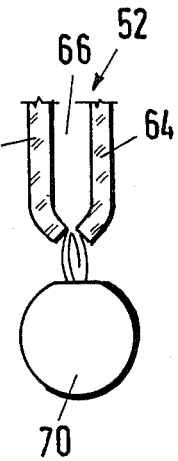
Figure 11:
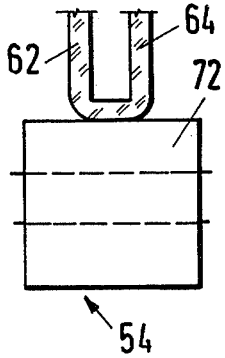
Figure 12:
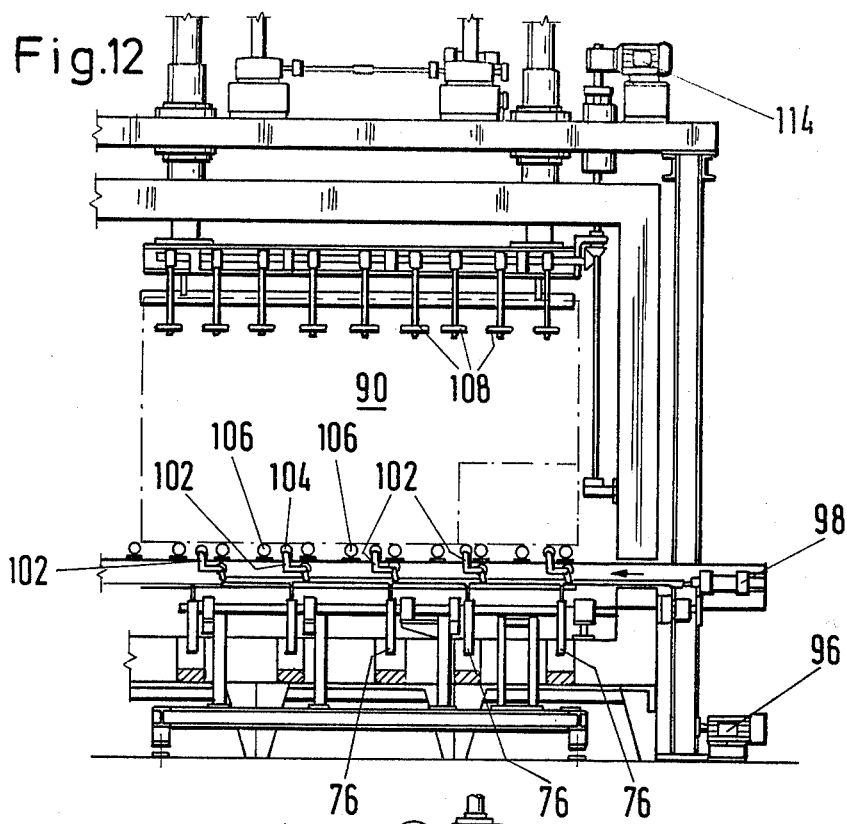
Figure 13:
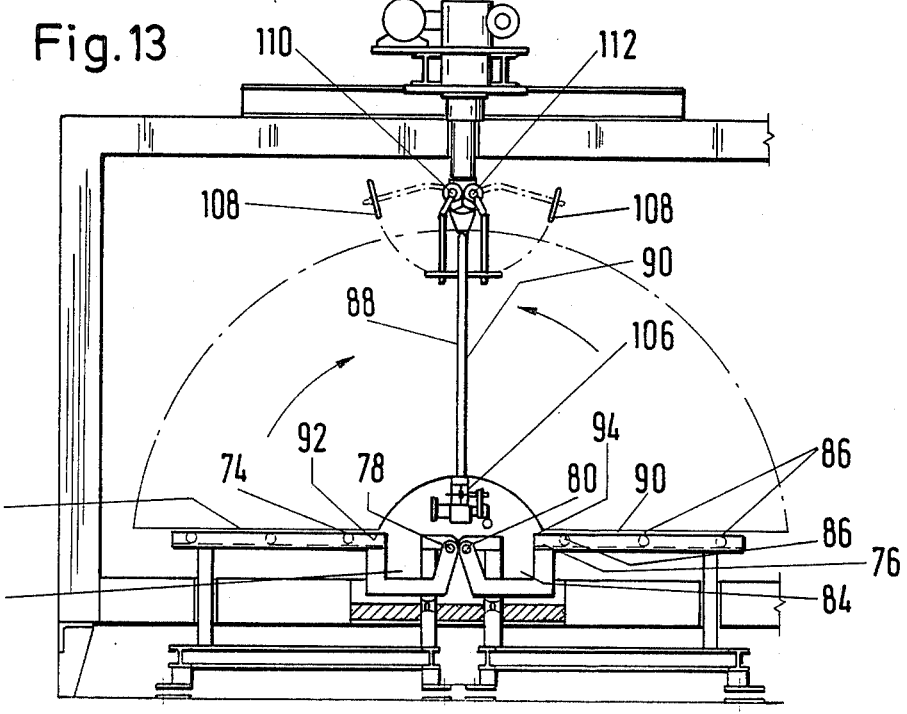
Figure 14:
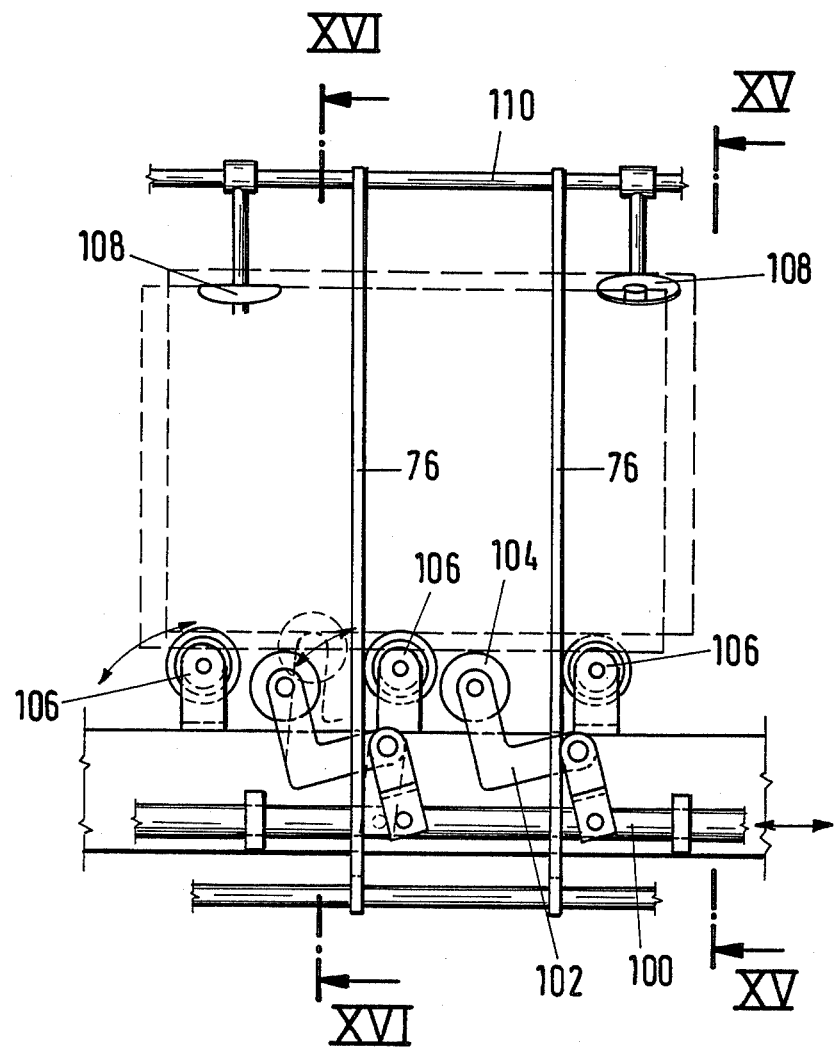
Figure 15:
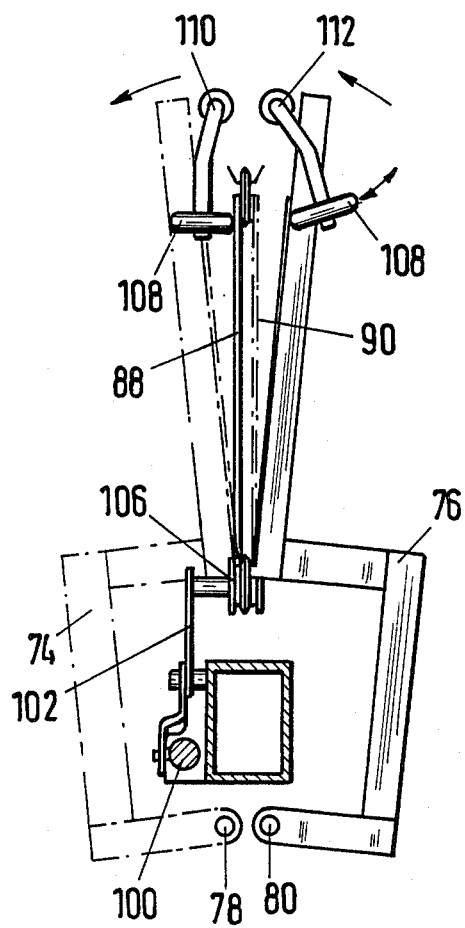
Figure 16:
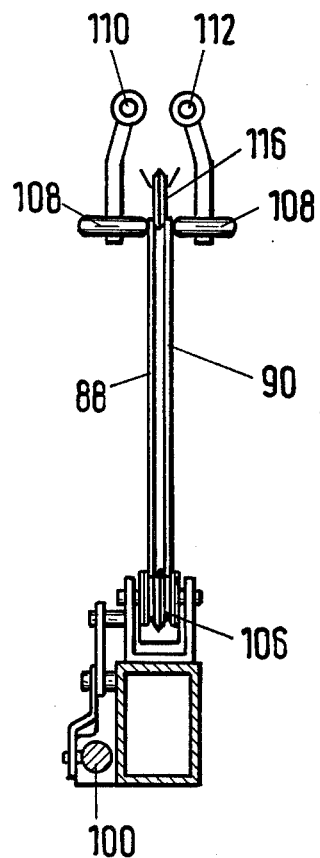
Figure 17:
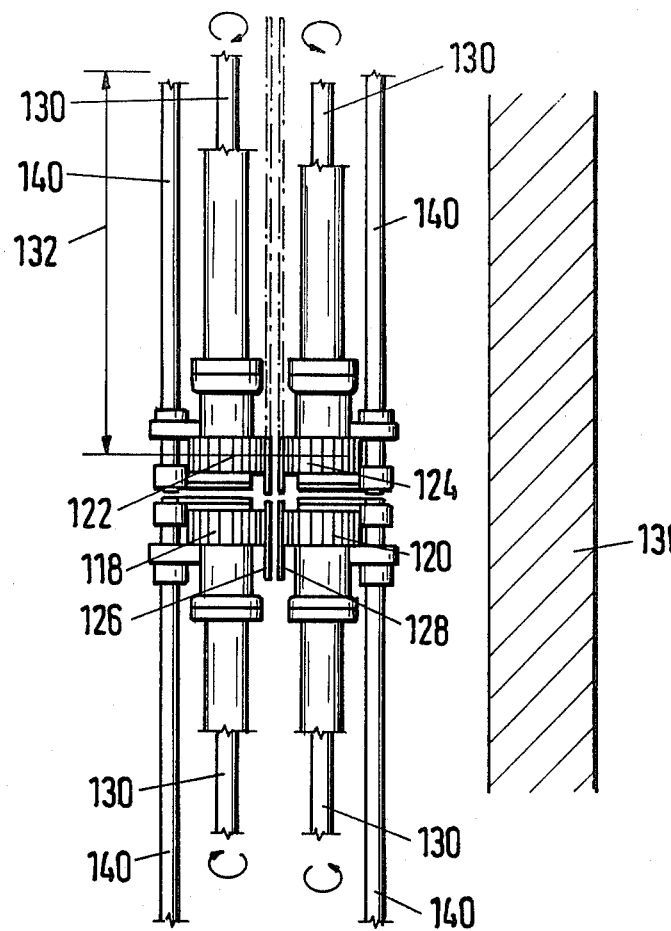
Figure 20:
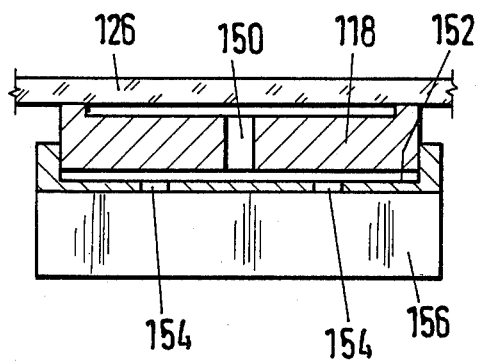
Figure 21:
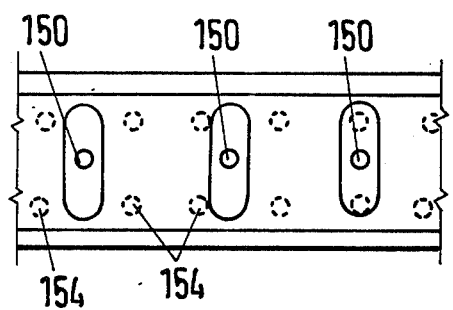
Figure 18:
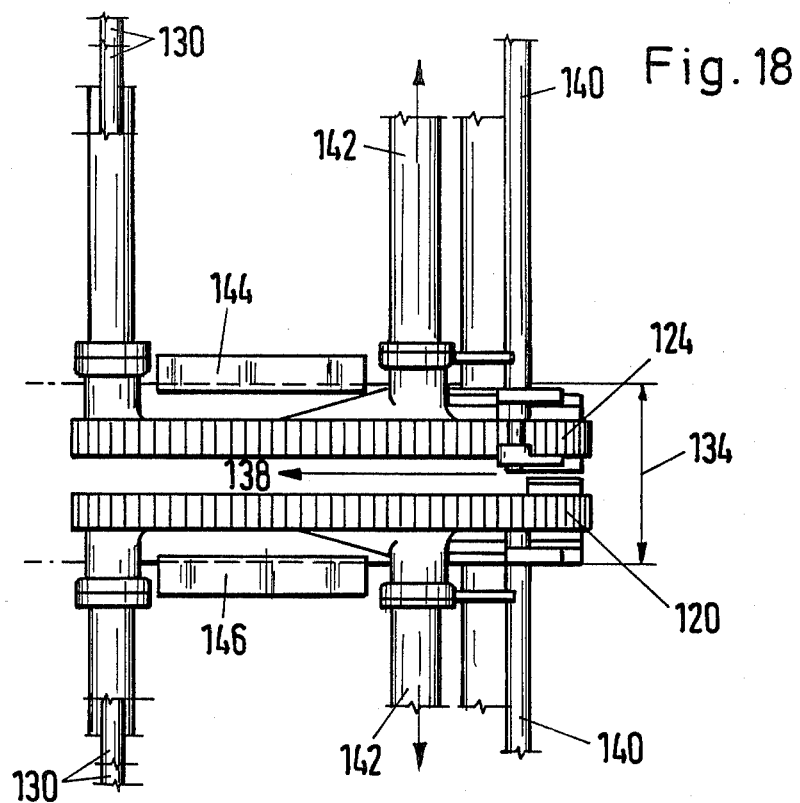
Figure 19:
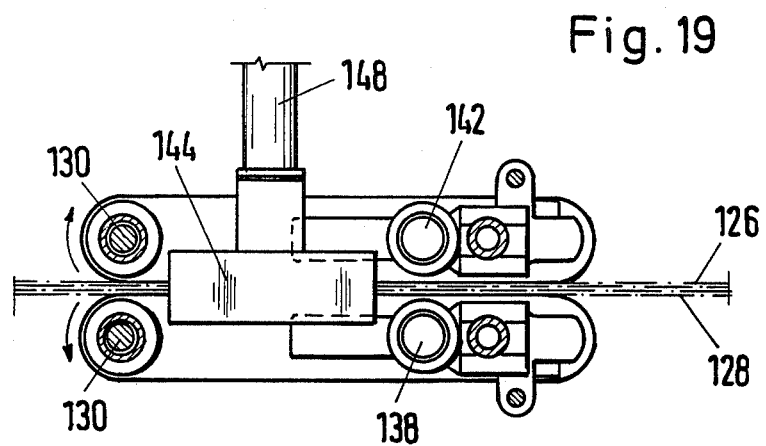

Further features and advantages of the invention derive from the claims and from the following description in which exemplary embodiments are set forth in detail with reference to the schematic drawing. Shown are:

FIG. 1: an exemplary embodiment of an apparatus of the invention in a plan view, partially cut;

FIG. 2: the exemplary embodiment of FIG. 1 along the section in the direction of the arrows II—II of FIG. 1;

FIG. 3: an exemplary embodiment of a fire-polishing means of the apparatus of the invention shown in section perpendicular to the axis of the tunnel furnace;

FIG. 4: the fire-polishing means of FIG. 3 in a plan view, partially cut;

FIG. 5: a detail of the fire-polishing means of FIGS. 3 and 4 in an enlarged scale, shown in section perpendicular to the longitudinal axis of the tunnel furnace;

FIG. 6: an exemplary embodiment of an apparatus of the invention in a plan view;

FIG. 7: the exemplary embodiment of the apparatus of the invention shown in FIG. 6, shown in a side view, partially cut;

FIG. 8: a section along the line VIII—VIII in FIG. 7;

FIG. 9: a section along the line IX—IX in FIG. 7;

FIG. 10: a section along the line X—X in FIG. 7;

FIG. 11: a section along the line XI—XI in FIG. 7;

FIG. 12: an exemplary embodiment of an apparatus of the invention in the front view seen from the conveying direction of the flat conveyor, partially cut;

FIG. 13: the apparatus of FIG. 12 in a side view, as seen from the left in FIG. 12, partially cut;

FIG. 14: an illustration similar to FIG. 12, whereby, however, the transfer means is shown in an enlarged scale;

FIG. 15: a section along the line XV—XV in FIG. 14, seen in the direction of the arrows;

FIG. 16: a section along the line XVI—XVI in FIG. 14, seen in the direction of the arrows;

FIG. 17: an exemplary embodiment of an apparatus of the invention in a side view, partially cut;

FIG. 18: the exemplary embodiment of FIG. 17 in a front view, partially cut;

FIG. 19: the exemplary embodiment of FIG. 17 and FIG. 18 in a plan view, partially cut;

FIG. 20: a section perpendicular to the longitudinal direction through a suction belt plus vacuum box of the exemplary embodiment of FIGS. 17–19, shown in an enlarged scale; and FIG. 21: a plan view of the suction belt of FIG. 20.

As shown in FIGS. 1 and 2, the inventive apparatus which is essentially composed of an elongated tunnel furnace similar to that disclosed, for example, in German Pat. No. 25 06 251 successively comprises a feeder means 12 (not shown in detail) for supplying broken individual panes referred to above and following as "cut to size" and, following thereupon, a pre-heating means composed of a horizontal furnace 14 in which the individual panes are conveyed in horizontal fashion on conveyor rollers of a known type, the inventive apparatus comprising these units in the direction of the arrow 10 identifying the conveying direction. The details of a fire-polishing means 18 that is arranged in a corresponding fire-polishing station shall be set forth in greater detail later, with reference to FIGS. 3 through 5. The fire-polishing means 18 is followed by a righting unit 20 in which the respective individual panes—here, the two individual panes of an all-glass double pane—are placed upright and aligned such with one another that those surfaces that have not come into contact with the conveyor rollers of the horizontal furnace 14 face toward the pane interspace of the all-glass double pane that is being manufactured. In a horizontal welding means 22, the upper and lower horizontal edges of the all-glass double panes are bonded to one another in a known way, whereupon a bonding of the vertical edges of the panes ensues in a vertical welding means 24; between the horizontal welding means 22 and the vertical welding means 24, the panes may potentially be turned by 90° around an axis lying perpendicular to the pane plane, so that the vertical welding means 24 can also be stationarily arranged in this case and can process the panes that are conducted through it. The finished all-glass double panes are cooled in upright position in a cooling furnace 26 and, following sorting in a sorting station 28, are turned and paletted in a turning and paletting station 30, whereupon a final rinse ensues in a rinsing station 32.

As FIGS. 3 and 4 show, the fire-polishing means 18 comprises a polishing burner 34 which is arranged in the middle between two individual panes 46 lying side-by-side on a roller conveyor in the direction of the arrows shown in FIG. 4 and having (later) horizontal edges facing toward one another. FIG. 4 shows that individual panes 46 having different formats can thereby be processed, namely between a minimum pane width 38 and a maximum pane width 40. In combination with FIG. 3, FIG. 4 thereby shows in what way the individual panes 46 are supported while they are being conveyed through the horizontal furnace 14 on conveyor rollers 42, whereby the arrow in FIG. 4 again shows the conveying direction 10.

It may be seen from FIG. 5 that the polishing burner 34 shown therein has its burner jets or, respectively, burner flames 44 charging the horizontal edges of the two individual panes 46 directed obliquely relative to the pane plane (this as a consequence of the X-shaped fashioning of the polishing burner 34) and the horizontal edges are fire-polished in this way. The gas feed or, respectively, the energy feed (in more general terms) to the polishing burner 34 ensues via the corresponding conduit 41.

In the implementation of the method of the invention, the above-described apparatus functions in the following way:

After the individual panes have been placed on a feedboard (not shown) and have been appropriately aligned, they are individually supplied to the conveyor roller system of the horziontal furnace 14 lying side-by-side, being supplied thereto via the feeder means 12. The pre-heating of the individual panes to a temperature of about 500° C. ensues here. Following the actual pre-heating zone, the individual panes pass the fire-polishing means 18, whereby the edges of the individual panes proceeding parallel to the conveyor means and later forming the lower, horizontal edges are smoothed by fire-polishing. Subsequently, two respective individual panes 46 are placed upright in the righting unit 20 and are placed on a roller path or the like in the desired spacing from one another as well as in the desired, mutually aligned position, whereupon the panes subsequently pass the horizontal welding means 22 and the vertical welding means 24 and, after traversing the cooling furnace 26, reach the rinse station 32 via the sorting station 28 and the paletting station 30 and are ultimately discharged.

As FIGS. 6 and 7 show, the apparatus of the invention in the exemplary embodiment shown therein comprises a warming means 48, a deforming means 50, a heating means 52, a fusing means 54 and a cooling means 56 following one another in the throughput direction (indicated by the arrow at the bottom right in FIG. 6 and in FIG. 7) of the panes conveyed in upright fashion. The bottom edge of the individual sodium silicate glass panes already aligned with one another and held at the desired distance from one another before reaching the warming means of FIGS. 6 and 7 and to be respectively united to form an all-glass double pane is referenced as the bottom pane edge 58 in FIG. 7.

As FIG. 8 shows, the warming means 48 comprises an outside burner 60 whose burner jets or, respectively, flames act on the edge regions of the individual panes 62,64 essentially perpendicular to the plane of these individual panes 62,64, whereby a part of the outside burner flames extends into the pane interspace 66 provided between the individual panes 62,64. FIG. 9 shows that the deforming means 50 comprises a double-conical shaping [or: molding] roller 60 which bends the edge regions of the individual panes 62,64 to be welded to one another toward one another without, however, seating these against one another. FIG. 10 shows that the heating means 52 comprises an inside burner 70—it is gas-fied in a known way, just like the outside burner 60—whose burner jets or, respectively, flames are directed onto the edge regions of the individual panes 62,64 essentially parallel to the plane of the individual panes 62,64 and which partially extend into the pane interspace 66. FIG. 11, finally, shows that the fusing means 54 comprises an essentially cylindrical welding roller 72 which fuses the individual panes 62,64 to one another in their edge region after heating to the welding temperature with the heating means 52.

In the illustrated exemplary embodiment, the above-described apparatus operates in the following way:

As already set forth, two respective individual panes of an all-glass double pane to be manufactured are first introduced into the warming means 48 standing on edge and coming from the right in FIG. 6 or, respectively, FIG. 7, whereby the individual panes are held in exact relative positioning at the desired spacing. The conveying of the panes thereby ensues in a known fashion, for example on a roller path (not shown) that extends over the full throughput length of the apparatus. In the warming means 48, the edge regions of the individual panes 62,64 are heated to a deformation temperature of, for example, 700° C. in the case of sodium silicate glass by the flames of the outside burner that act essentially perpendicularly on the pane surfaces, whereby this deformation temperature in fact suffices to bend the edge regions of the individual panes 62,64 but this temperature nonetheless lies clearly below the welding temperature of about 850° C. at which a fusing of the edge regions of the individual panes to one another becomes possible. It is thereby essential that the jet direction of the burner flames of the outside burner 60 lie as perpendicularly as possible relative to the pane plane so that the pane surfaces can be quickly heated in this way upon optimum exploitation of the outside burner energy. Subsequently, the individual panes 62,64 then traverse the shaping or molding roller 68, whereby the edge regions are bent toward one another without already being brought into contact with one another. The inside burner of FIG. 10, i.e. in the heating means 52, then charges the edge regions bent toward one another with the corresponding burner flames which, in this case, proceed essentially in the pane plane: In that the edge regions have already been bent toward one another, the pane edges can be optimally heated to the welding or fusing temperature given a farthest-reaching preservation of the remaining pane regions from thermal stresses. The individual panes 62,64 are then pressed together and fused with one another with the cylindrical welding roller 72 (FIG. 11) in order to form an essentially smooth weld.

The cooling of the completed all-glass double panes then ensues in the cooling means 56, whereby—due to the far-reaching thermal preservation of the central region of the panes which is enabled by the step-by-step warming or, respectively, heating of the edge regions of the panes to, first, the deformation temperature and only then to the welding temperature —the cooling process develops in an especially energy-beneficial and time-beneficial way.

As FIGS. 12 and 13 show, the apparatus of the invention in the exemplary embodiment shown therein comprises two tilting frames 74,76 which can be swivelled up out of an essentially horizontal position shown in FIG. 13 into an essentially vertical position shown in FIG. 15 and back again, being swivelled in the direction of the arrows shown in FIG. 13 around a respective, horizontal tilting axis 74,76. In the horizontal position shown in FIG. 13, the two tilting frames 74,76 each composed of a plurality of walking beams and each comprising a cam-like jog 56,84 in their regions adjacent to the tilting axes 78,80 lie under the conveying plane of a flat conveyor (not shown in detail) whose conveyor rollers 86 are shown at the right in FIG. 13 and which, coming from the right in FIG. 13, extends over the entire acceptance region of the tilting frames 74,76 lowered into their acceptance position, extending thus under the bottom edge of the upright conveyor, whereby the conveying plane of its conveyor rollers 86 lies above the lowered tilting frames 74,76. As FIG. 13 shows, two individual panes 88,90 of an all-glass double pane to be manufactured lie on the flat conveyor comprising the conveyor rollers 86, these individual panes 88,90 having been brought in with the flat conveyor from the right as seen in FIG. 13 and with a mutual spacing from one another. The tilting frames 74,76 comprise detents 92,94 against which those edges of the individual panes 88,90 lying at the bottom after the righting can be seated when the tilting frames 74,76 are swivelled up, i.e. the right-hand edge of the individual pane 88 in FIG. 13 or, respectively, the left-hand edge of the individual pane 90.

FIGS. 12 and 13 also show that the tilting frames 74,76 are actuatable with a corresponding rodding proceeding from a tilting frame drive 96. A transfer means comprises a transfer drive 98 by means of which a tie rod 100 is moved back and forth in the direction of the arrow shown in FIG. 12, as a result whereof transfer rollers 104 seated at articulated levers 102 joined thereto are height-adjustable, whereby further details relating hereto shall be set forth later. The transfer rollers 104 are allocated to conveyor rollers 106 of an upright conveyor whose functioning shall be set forth in detail farther below.

FIGS. 12 and 13 also show that a series of flap rollers 108 are provided close to the upper pane edge of the righted individual panes 88,90, namely a respective row of flap rollers at each side of the erect individual panes 88,90, whereby the corresponding flap rollers are respectively seated at a swivel beam 110,112 that can be pivoted with a flap roller driver 114 around in the conveying direction of the upright conveyor comprising the conveyor rollers 106. In FIG. 13, the flap rollers 108 are shown once with broken lines in an open position and once with solid lines in a closed position. Going beyond the details set forth above, FIG. 14 shows further details of the transfer means comprising the lifter rod 100 (movable back and forth in the direction of the double arrow), the articulated levers 102 and the transfer rollers 104 in interaction with the conveyor rollers 106, whereby it may be seen that, by actuating the lifter rod 100 and a corresponding swivel of the articulated levers 102, the transfer rollers 104 are movable, first, into a position lying above the supporting plane of the conveyor rollers 106 and, second, into a position lying under the corresponding conveying plane, excellently shown in FIG. 14. Together with FIGS. 15 and 16, FIG. 14 also shows further details of the alignment means in the region of the upper edges of the erect individual panes, this alignment means being reproduced sic by the flap rollers 108 which are actuatable by turning the swive beam 110. With respect to the alignment means for the upper pane edges, FIG. 16 thereby also shows a distancer 116 against which the individual panes 88,90 can be pressed with the flap rollers 108 after they have been placed upright. Further, FIG. 15 and FIG. 16 show that the conveyor rollers 106 are provided with channel-like guides for the bottom pane edges, these guaranteeing that the bottom pane edges have the suitable alignment and the suitable spacing from one another after the individual panes 88,90 have been placed onto the conveyor rollers 106, guaranteeing this in interaction with the upper alignment means composed of the flap rollers 108 and of the distancers 116.

The apparatus set forth above functions in the following way:

As seen in FIG. 13, individual panes 88,90 of an all-glass double pane to be respectively manufactured are conducted following one another from the right on the flat conveyor comprising the conveyor rollers 86. The individual panes 88,90 run on the conveyor rollers 86 of the flat conveyor until they arrive into a position lying above the two tilting frames 74,76 situated in their acceptance position, whereby the tilting frames 74,76 are situated in their horizontal position shown in FIGS. 12 and 13 in which their acceptance surface including the detents 92,94 lies under the conveying plane of the conveyor rollers 86. The tilting arms sic 74,76 are then swivelled up in the direction of the arrows shown 13, whereby the individual panes 88,90 become supported against the detents 92,94 to an increasing degree. The jogs 56,84 thereby provide the necessary clearance for the transfer means comprising the lifter rod 100, the articulated levers 102 and the transfer rollers 104. As soon as the tilting frames 74,76 have reached the position shown in FIG. 15, the transfer rollers 104 are lifted up such by actuation of the transfer drive 98 via the lifter rod 100 and the articulated levers 102 that they lift the bottom edges of the individual panes 88,90 off from the detents 92,94 of the tilting frames 74,76. The flap rollers 108 are swivelled into the position shown in FIG. 15 wherein they already laterally support the upper pane edges while the tilting frames 74,76 are still hinged up. The tilting frames 74,76 are then pivoted out of the erect position shown in FIG. 15 back into the horizontal position. The transfer rollers 104 are lowered and deposit the individual panes 88,90 into the channel-shaped guides of the conveyor rollers 106 of the upright conveyor. The flap rollers 108 are swivelled in so that they place the upper edges of the individual panes 88,90 against the distancer 116, whereupon the individual panes then assume the alignment shown in FIG. 16 in which they are conveyed on with the upright conveyor comprising the conveyor rollers 106 and, in particular, being capable of being supplied to a welding station as comprises the subject matter of, for example, German Patent Application No. P 36 25 798.2-45 and in combination wherewith the invention set forth above is especially suited, even though, of course, the idea of the invention also covers the preparation of individual panes for, for example, the manufacture of insulating glass panes having glued edge profiles. Before the insertion or, respectively, during the insertion of the pane pair into the welding station of the afore-mentioned species for the manufacture of all-glass double panes, of course, the individual panes 88,90 are also brought into exact alignment with one another in longitudinal direction, whereby an appropriate thrust means or the like attacks in a known way at their edges lying at the back on the conveyor rollers 106 of the upright conveyor as seen in conveying direction.

As FIGS. 17 and 18 show, the apparatus of the invention in the exemplary embodiment shown therein comprises two pairs of suction belts 118,120 and, respectively, 122,124 arranged above one another that are fashioned as endless apron conveyor chains, whereby the individual aprons are composed of ceramic material or, on the other hand, are surface-treated by, for example, hard chrome plating or plasma spraying at their seating surface facing individual panes 126,128 of an all-glass double pane being manufactured, so that the contact surfaces of the suction belts do not produce any impressions on the glass of the individual panes 126,128 during conveying, these individual panes, of course, having been heated (to about 500° C., for example, in the case of sodium silicate glass) before reaching the welding station that is allocated to the exemplary embodiment of the invention. The suction belts 118,120,122,124 are moved in a controllable fashion by drive shafts 130. The upper pair of suction belts 122,124 is height-adjustable over a positioning distance 132 for adaptation to different pane formats, whereby the minimum height of all-glass double panes to be manufactured is referenced 134 in FIG. 18. The overall apparatus is suspended or, respectively, supported at structures that are not shown.

As especially shown by FIG. 18—the conveying direction of the suction belts 118,120—122,124 is referenced 138—, a clamping means 140 with which the suction belts 118,120,122,124 can be re-tightened or adjusted at all in terms of their tension is provided. Further, FIG. 18 shows an underpressure line 142 with which a vacuum box (to be set forth farther below) can be charged with underpressure. FIG. 18 further shows burner devices 144,146 for bonding the upper and lower pane edges of a type shown, for example, in German Pat. No. 25 06 251. FIG. 19 shows how the burner device 144 is supported in a known way with a burner arm 148.

As FIGS. 20 and 21 show, the individual pane 126 of the all-glass double pane being manufactured lies against that seating surface of the suction belt 118 which faces toward it, this being provided with a row of suction bores 150 arranged spaced in its longitudinal direction. The suction belt 118 lies laterally against a carrying chamber 152 in essentially sealing fashion, this carrying chamber 152—like the suction belt 118—being fashioned elongated and being chargeable with underpressure from an underpressure channel 156 via connecting openings 156 sic, this underpressure channel 156 being in turn placed under underpressure via the underpressure line 142 (not shown in FIGS. 20 and 21).

With respect to the technical details of the apparatus of the invention or, respectively, to the welding process implemented therewith—this, moreover, potentially ensuing in the way set forth in German Pat. No. 25 06 251—, let it be noted that the conveying speed of the suction belts can, for example, amount to 1 through 2 meters per minute, whereby the underpressure can amount, for example, to 14 kPa measured at the contact surface of the suction belts 118,120,122,124 with the individual panes 126,20 sic. The vacuum generator charging the underpressure line 142 operates with hot air having an intake temperature or, for example, 500° C. and with an overall pressure difference of 15 kPa. For example, a radial ventilator for hot air at 500° C. can be provided, this generating the afore-mentioned contact vacuum of 14 kPa which guarantees the required retaining force at the contact surfaces between the suction belts 118, 120,122,124 and the glass surfaces. Of course, the guidances of the suction belts 118,120,122,124 are fashioned such that no significant losses in retaining power occur due to leaks. The connecting openings 154 between the underpressure channel 156 and the carrying chamber 152 can advantageously be fashioned adjustable, so that they can be at least partially closed during introduction and withdrawal of the panes 126,128 in order to thus avoid pressure losses. The suction belts 118,120,122,124 are mechanically coupled and their conveying speed is infinitely adjustable.

In the illustrated exemplary embodiment, the apparatus of the invention functions in the following way:

The spacing of the two suction belts 118,120 or, respectively, 122,124 of each of the pairs of suction belts 118,120 and, respectively, 122,124 is set in accord with the desired spacing between the individual panes 126,128 of the all-glass double pane being manufactured. Further, the height of the upper suction belt pair 122,124 is selected according to the pane format. Standing on loose rollers, pairs of individual panes 126,128 already aligned with one another are then transferred to the suction belts 118,120,122,124, potentially given the assistance of a slide. As a result of the underpressure generated via the stationary connecting openings 154 of the stationary vacuum box formed by the carrying chamber 152 and by the underpressure channel 156, the panes 126,128 are reliably held in position against the suction belts 118,120, 122,124 and the latter conduct them past the burner devices 144,146. Following thereupon—insofar as the horizontal welding has been carried out—, a turning of the panes by 90° around an axis lying perpendicular to the pane plane can then ensue, whereupon the vertical edges can be welded in a following welding apparatus that is constructed quite similar to the apparatus set forth above. Finally, the panes are conveyed out of the region of the suction belts 118,120,122,124 via driven rollers on which the panes then reside following the welding station and on which, for example, they can be supplied to a cooling furnace.

Both individually as well as in arbitrary combinations, the features of the invention disclosed in the above description, in the drawing as well as in the claims can be essential for the realization of the invention in the various embodiments thereof.

I claim:

1. Method for bonding the edges of all-glass multiple panes, particularly all-glass double panes, whereby the individual panes moving through an elongated tunnel furnace or the like are cut to size, may be washed, are subjected to an at least partial edge smoothing, are aligned with one another and, after being pre-heated to a pre-heating temperature lying below the deformation temperature of the glass, are bonded to one another at the horizontal and vertical pane edges, being bonded while standing upright, characterized in that the individual panes cut to size and potentially washed are individually pre-heated lying on their surface facing away from the pane interspace of the all-glass multiple pane to be manufactured; and in that the individual panes are subsequently placed upright and are placed together to form groups of individual panes in accord with an all-glass multiple pane to be manufactured, whereupon the edge bonding ensues.

2. Method according to claim 1, characterized in that, after the pre-heating the individual panes are fire-polished at least along their edges proceeding parallel to their conveying direction, these edges representing the later, bottom horizontal edges.

3. Method according to claim 2, characterized in that two respective individual panes are conducted through a fire-polishing station, being conducted therethrough spaced and having their later, lower horizontal edges facing one another lying side-by-side and are thereby subjected to the fire polishing proceeding from the clearance remaining between them.

4. Method according to one of the preceding claims, whereby the edge regions of the individual panes provided for the fabrication of the all-glass multiple panes to be manufactured, held at the desired, mutual spacing from one another and aligned relative to one another are heated to welding temperature, are brought into mutual seating under mechanical stressing, and are then fused to one another, characterized in that the edge regions of the individual panes are first warmed to a deformation temperature lying below the welding temperature; in that the edge regions of the individual panes to be bonded to one another are then bent toward one another under a first mechanical stressing without bringing said edge regions into contact with one another; in that, subsequently, a heating of the edge regions to the welding temperature ensues; and in that the softened edge regions are fused with one another under a second mechanical stressing.

5. Method according to claim 4, characterized in that, for heating to the deformation temperature, the edge regions are charged with outside burner flames or the like essentially perpendicular to the pane plane.

6. Method according to claim 5, characterized in that a part of the outside burner flames is directed into the pane interspace.

7. Method according to claim 4, characterized in that, for heating to the welding temperature, the edge regions are charged with inside burner flames or the like essentially parallel to the pane plane.

8. Method according to claim 7, characterized in that a part of the inside burner flames is directed into the pane interspace.

9. Method according to claim 4, characterized in that the first mechanical stressing is accomplished with an essentially double-conical shaping roller or the like.

10. Method according to claim 4, characterized in that the second mechanical stressing is accomplished wth an essentially cylindrical welding roller.

11. Method according to claim 4, characterized in that, given employment of sodium silicate glass for the individual panes, the deformation temperature amounts to about 700° C. and the welding temperature amounts to about 850° C.

12. Apparatus for bonding the edges of all-glass multiple panes, particularly all-glass double panes, given passage of the individual panes through an elongated tunnel furnace or the like, comprising a means for cutting the individual panes to size, potentially comprising a washing means, comprising a means for smoothing at least a part of the pane edge, comprising a pre-heating means and comprising a welding means for bonding the horizontal edges and the vertical edges of the mutually aligned individual panes of a respective all-glass multiple pane in the vertical position thereof, characterized in that said pre-heating means comprises a horizontal furnace (14) for the acceptance of individual panes (46) singly conveyed in horizontal attitude; and an erecting unit (20) for placing the individual panes (46) upright and for combining the latter into groups of individual panes corresponding to a respective all-glass multiple pane to be manufactured.

13. Apparatus according to claim 12, characterized by a fire-polishing means (18) for fire-polishing at least one of the edges of the individual panes (46) proceeding parallel to the conveying direction (10) and representing the later, lower horizontal edges of the individual panes (46), said fire-polishing following the pre-heating event but preceding the righting event.

14. Apparatus according to claim 13, characterized in that the fire-polishing means (18) comprises at least one polishing burner (34).

15. Apparatus according to claim 14, characterized in that the polishing burner (34) is arranged in the clearance between respectively two individual panes (46) conducted through a polishing station comprising the fire-polishing means, being conducted therethrough side-by-side with later, lower horizontal edges facing toward one another, and comprises burner bores or the like facing the two horizontal edges in pairs X-shaped and having burner flames (44) charging the horizontal edges directed onto the pane plane obliquely relative to the pane plane.

16. Apparatus according to claim 12, comprising a heater means for heating the edge regions of the individual panes provided for the fabrication of the all-glass multiple panes to be manufactured, held at the desired spacing from one another and aligned relative to one another to welding temperature, and comprising a mechanical stressing means functionally following thereupon for seating the edge regions heated to welding temperature against one another and for fusing said edge regions, characterized in that the heater means comprises a warming means (48) for warming the edge regions of the individual panes (62,64) to a deformation temperature lying below the welding temperature; in that the stressing means comprises a deforming means (50) following the warming means (48) for bending the edge regions to be bonded to one another toward one another without bringing said edges into contact with one another; in that the heater means comprises a heating means (52) following the deforming means (50) for heating the edge regions to the welding temperature; and in that the stressing means comprises a fusing means (54) following the heating means (52) for fusing the softened edge regions to one another.

17. Apparatus according to claim 16, characterized in that the warming means (48) comprises at least one outside burner (60) or the like radiating essentially perpendicular to the pane plane.

18. Apparatus according to claim 17, characterized in that a part of the outside burner flames is directed into the pane interspace (66).

19. Apparatus according to claim 16, characterized in that the heating means (52) comprises at least one inside burner (70) or the like radiating essentially parallel to the pane plane.

20. Apparatus according to claim 19, characterized in that a part of the inside burner flames is directed into the pane interspace (66).

21. Apparatus according to claim 16, characterized in that the deforming means (50) comprises at least one essentially double-conical shaping roller (68).

22. Apparatus according to claim 16, characterized in that the fusing means (54) comprises at least one essentially cylindrical welding roller (72).

23. Apparatus according to claim 12 comprising a means for righting respectively two individual panes of a double glass pane being manufactured, said individual panes being brought in on a flat conveyor lying behind one another in an essentially horizontal attitude and being thereby brought into a relative position essentially corresponding to that of the double glass pane being manufactured, comprising two tilting frames that are swivellable from a horizontal acceptance position placed under the conveying plane of the flat conveyor into a transfer position, comprising an upright conveyor conveying transversely relative to the flat conveyor and having a plurality of conveyor rollers extending along the tilting axis of the tilting frames whose supporting plane lies above the conveying plane of the flat conveyor, and comprising a tilting frame detent against which those edges of the individual panes lying at the bottom after the righting come to be seated and whose spacing from the tilting frame axis is adjustable such that those pane edges lying at the bottom after the righting can be placed on the conveyor rollers of the upright conveyor when the tilting frame is swivelled up, characterized in that both tilting frames (74,76) can be synchronously swivelled up into the essentially vertical transfer position from the horizontal acceptance position, being swivellable in opposite angular directions around swivelling axes (78,80) immediately adjacent to one another; in that the flat conveyor provided with conveyor rollers (86) extends under the upright conveyor (100,102,104, 106) over the entire acceptance region of the two tilting frames (74,76) situated under the conveying plane of the flat conveyor (86) in their horizontal acceptance position; and in that each of the tilting frames (74,76) comprises a tilting frame detent (92,94) against which those pane edges of the individual panes lying at the bottom after the righting of the two individual panes each positioned above one of the tilting frames (74,76) with the flat conveyor (86) come to be seated when the tilting frames (74,76) are swivelled up.

24. Apparatus according to claim 23, characterized by a transfer means (100,102,104) for lifting the upright individual panes (88,90) from the detents and for lowering said individual panes onto the conveyor rollers (106) after the tilting frames (24,76) have been swivelled back.

25. Apparatus according to claim 24, characterized in that the transfer means comprises a plurality of height-adjustable transfer rollers (104) having a rotational axis that is parallel to that of the conveyor rollers (106).

26. Apparatus according to claim 25, characterized in that the transfer rollers (104) are respectively seated at an articulated lever (102); and in that the articulated levers (102) are swivellable for the height adjustment of the transfer rollers (104), being swivellable on the basis of a lifter rod (100) which is displaceable parallel to the tilting axis (78,80) of the tilting frames (74,76).

27. Apparatus according to claim 23, characterized in that the conveyor rollers (86) are provided with channel-shaped guides for adjusting the spacing of the individual panes (88,90) on the upright conveyor (106).

28. Apparatus according to claim 23, characterized in that the upright conveyor (106) comprises an alignment means (108, 110,112,114,116) for the upper pane edges in the region of the tilting frames (74,76).

29. Apparatus according to claim 28, characterized in that the alignment means comprises two, central distancers (116) aligned with one another and, in the region of each of the tilting frames (74,76), also comprises at least two flap rollers that can be swivelled around an axis parallel to the tilting axis in the direction toward the distancers (116) and away from the distancers (116), said flap rollers (108) having an essentially vertical rotational axis and being capable of being seated against the individual panes (88,90) close to the upper pane edges.

30. Apparatus according to claim 29, characterized in that the flap rollers (108) are each seated at a respective swivelling beam (110,112).

31. Apparatus according to claim 24, characterized in that the tilting frames (74,76) are jogged cam-like in their region placed close to the tilting axes (78,80) and adjacent to the transfer means (100,102,104) in horizontal position.

32. Apparatus according to claim 12 comprising a means for guiding the outer individual panes of the all-glass multiple panes, particularly all-glass double panes, which move through the elongated welding furnace in upright position when welding the horizontal and/or vertical pane edges, comprising guide elements arranged at both sides of the pane plane above one another and at a distance from one another, these guide elements comprising suction openings chargeable with underpressure, characterized in that the guide elements each comprise two endless suction belts (118,120,122,126) lying opposite one another, attacking at the respective individual pane (126,128) and driveable in controlled fashion in the conveying direction of the individual panes, said suction belts being provided with a series of suction bores (150) arranged spaced in the longitudinal direction thereof and that side of said suction belts facing toward the pane surface and being laterally essentially sealed pressing against an elongated vacuum box (152,156) that can be charged with underpressure.

33. Apparatus according to claim 32, characterized in that the suction belt (118,120,122,124) is fashioned as an apron conveyor chain.

34. Apparatus according to claim 33, characterized in that the individual aprons of the apron conveyor chain are composed of ceramic material.

35. Apparatus according to claim 33, characterized in that the individual aprons of the apron conveyor chain are surface-treated at their seating surface facing toward the pane surface.

36. Apparatus according to claim 32, characterized in that the vacuum box comprises a conveying chamber (152) facng toward the suction belt (118,120,122,124) and comprises an underpressure channel (156) communicating therewith via connecting openings (154).

37. Apparatus according to claim 36, characterized in that the opening crossection of at least a part of the connecting openings (154) can be adjusted between a closed and an open position.

38. Apparatus according to claim 32, characterized in that the mutual spacing between two suction belts (118,120,122,124) arranged lying opposite one another is adjustable.

39. Apparatus according to claim 32, characterized in that the height of the upper pair of suction belts (122,124) is adjustable relative to the lower pair of suction belts (118,120).

* * * * *